(12) United States Patent
Boeltl et al.

(10) Patent No.: US 12,349,822 B2
(45) Date of Patent: Jul. 8, 2025

(54) HOOK FOR SUSPENDING ITEMS

(71) Applicant: Acorn Engineering Company, City Of Industry, CA (US)

(72) Inventors: Darryl M. Boeltl, Whittier, CA (US); Christopher Adkison, Ontario, CA (US)

(73) Assignee: Acorn Engineering Company, City of Industry, CA (US)

( * ) Notice: Subject to any disclaimer, the term of this patent is extended or adjusted under 35 U.S.C. 154(b) by 0 days.

(21) Appl. No.: 17/944,909

(22) Filed: Sep. 14, 2022

(65) Prior Publication Data

US 2024/0081569 A1   Mar. 14, 2024

(51) Int. Cl.
| | |
|---|---|
| *F16B 45/00* | (2006.01) |
| *A47G 29/08* | (2006.01) |
| *A47K 10/12* | (2006.01) |
| *F16M 13/02* | (2006.01) |

(52) U.S. Cl.
CPC .............. *A47G 29/08* (2013.01); *A47K 10/12* (2013.01); *F16B 45/00* (2013.01); *F16M 13/02* (2013.01)

(58) Field of Classification Search
CPC ........ F16B 45/00; F16B 45/02; F16B 45/022; F16B 45/023; F16B 45/024; F16B 45/026; A47K 10/12
USPC ....... 248/691, 690, 692, 304, 305, 306, 308, 248/339
See application file for complete search history.

(56) References Cited

U.S. PATENT DOCUMENTS

| | | | |
|---|---|---|---|
| 2,901,207 A | 8/1959 | Adam | |
| 3,343,773 A | 9/1967 | Lorenz | |
| 9,301,658 B1 | 4/2016 | Boeltl | |
| 10,610,037 B1* | 4/2020 | deLoache, III | .... A47G 25/0642 |
| 2004/0124330 A1* | 7/2004 | Tanaka | ...................... B60R 7/02 |
| | | | 248/339 |
| 2006/0071137 A1 | 4/2006 | Livingstone | |
| 2009/0250579 A1* | 10/2009 | Nishida | ..................... B60R 7/08 |
| | | | 248/308 |

FOREIGN PATENT DOCUMENTS

WO     2023/211333 A1   11/2023

* cited by examiner

*Primary Examiner* — Alfred J Wujciak
(74) *Attorney, Agent, or Firm* — Honigman LLP; Eric J. Sosenko; Jonathan P. O'Brien

(57) ABSTRACT

A ligature resistant hook for supporting a personal article from a wall or door or other vertical support surface. The hook includes a pivot arm that is biased into a retracted, substantially vertical position and moveable between the retracted position, an over-extended positon and an extended position located between the retracted and over-extended positions. The pivot arm is biased so as to prevent movement of the pivot arm into the over-extended position until exceeding a threshold weight applied to the pivot arm.

18 Claims, 7 Drawing Sheets

HOOK FOR SUSPENDING ITEMS

BACKGROUND

1. Field of the Invention

The present invention generally relates to a hook for suspending personal items, such as a clothes or a towel. More particularly, the invention relates to such a hook that is ligature resistant and intended for mounting to a vertical support surface of a wall, door, post or other object.

2. Description of Related Art

Items having a ligature resistant design are a generally a requirement in institutions where the occupants of the institution may be at risk for self-harm. Such ligature resistant items are designed so that attachment and fixation of a ligature, such as a rope, belt, cloth, etc., to the item is inhibited.

Wall mounted hooks offer convenience to the occupants of an institution for the hanging of clothes, towels and other personal items. However, typical wall mounted hooks are rigid and cannot be employed where ligature resistance is required. As a result, ligature resistant hooks have been developed where the pivot arm of the hook is moveable once a weight has been applied to the hook that exceed a weight limit. Movement of the hook is to a position where any ligature applied to the hook cannot remain on the hook and, as such, slides off of the hook.

Early embodiments of ligature resistant hooks included flexible hooks made of materials that would bend under the influence of a weight equal or greater than the weight limit. Other ligature resistant hooks employ mechanical mechanisms to maintain the hook in its use position until the weight limit is applied to the hook. These mechanisms have included spring mechanisms where a pivot arm of the hook is coupled to an extension or torsion spring having a spring constant selected to define the corresponding desired weight limit. Other mechanisms employed with ligature resistant hooks include various detent mechanisms. The detent mechanism retains the pivot arm of the hook at a certain inclination, relative to the wall, until the retaining force of the detent mechanism is overcome.

SUMMARY

In satisfying the above need, as well as overcoming the enumerated drawbacks and other limitations of the related art, the present invention provides a retractable hook.

In another aspect of the invention, a retractable hook for supporting a personal article from a vertical support surface is provided. The retractable hook includes a mounting assembly, a pivot arm and a biasing member. The pivot arm is supported by the mounting assembly and is moveable between a retracted position, an extended position and an over-extended positon, wherein the extended position is located between the retracted and over-extended positions. The biasing member is coupled between the mounting assembly and pivot arm and defines a threshold weight for the hook. During use, the biasing member biasing the pivot arm into the retracted position, while allowing the pivot arm to move from the retracted position to the extended position upon application to the pivot arm of a weight up to the threshold weight. Upon a weight greater than the threshold weight being applied to the pivot arm, the pivot arm moves from the extended position to the over-extended position.

In another aspect, in the retracted position the pivot arm extends in a direction substantially parallel to a plane defined by the rear planar surface of the mounting plate In a further aspect, in the extended position the pivot arm extends in a direction oriented between substantially parallel to the rear planar surface of the mounting base and not greater than 90 degrees from a plane defined by the rear planar surface of the mounting plate.

In an additional aspect, in the over-extended position the pivot arm extends in a direction oriented greater than 90 degrees from a plane defined by the rear planar surface of the vertical support surface.

In another aspect, the mounting plate includes a wall plate and a mounting base.

In yet a further aspect, the pivot arm is rotationally mounted to the mounting base.

In still an additional aspect, the mounting base is rotationally fixed relative to the wall plate.

In yet another aspect, the biasing member is coupled between the pivot arm and the mounting base.

In a further aspect, the biasing member is a torsion spring.

In an additional aspect, the mounting plate further comprises ligature resistant features, the ligature resistant features including all exposed upwardly facing surfaces exhibiting an angular orientation of greater than 90 degrees measured from a plane define by the rear planar surface.

In another aspect of the invention, a ligature resistant, retractable hook for supporting a personal article is provided. The hook is configured for mounting to a vertical support surface and includes a mounting assembly and a pivot arm. The mounting assembly includes a rear planar surface for securement against the vertical support surface. The mounting plate also includes ligature resistant features including that all upwardly facing exposed surfaces exhibit an angular orientation of greater than 90 degrees, measured from a plane defined by the rear planar surface. The pivot arm is moveably supported by the mounting assembly and biased into a retracted position, but is moveable between the retracted position, an over-extended positon and an extended position that is located between the retracted position and the over-extended position. The over-extended position is a position located greater than 90 degrees from the retracted positon.

In another aspect, the pivot arm is biased by a spring.

In a further aspect, the spring is a torsion spring.

In an additional aspect, the pivot arm includes a catch extending from a pivot sleeve that defines an axis of rotation for the pivot arm and for movement between the retracted, extended and over-extended positions.

In yet another aspect, the spring is located within the pivot sleeve.

In still a further aspect, the pivot arm includes a bias against movement into the over-extended position up to a predetermined weight.

In an additional aspect, a biasing means is provided for biasing the pivot arm into the retracted position.

In another aspect, the biasing means defines a predetermined weight and biases the pivot arm against movement into the over-extended position at weights less than the predetermined weight.

In a further aspect, the predetermined weight is in the range of 7 to 15 pounds.

In an additional aspect, the biasing means limits movement of the pivot arm from the retracted position to the extended position upon application of a weight to the pivot arm up to a threshold weight, and limits movement of the pivot arm into the over-extended position upon application of a weight to the pivot arm greater than the threshold weight.

Further objects, features and advantages of this invention will become readily apparent to persons skilled in the art after review of the following description, including the claims, and with reference to the drawings that are appended to and form a part of this specification

DETAILED DESCRIPTION

As used in the description that follows, directional terms such as "upper" and "lower" are used with reference to the orientation of the elements as presented in the figures. Accordingly, "upper" indicates a direction toward the top of the figure and "lower" indicates a direction toward the bottom of the figure. The terms "left" and "right" are similarly interpreted. The terms "inward" or "inner" and "outward" or "outer" indicate a direction that is generally toward or away from a central axis of the referred to part, whether or not such an axis is designated in the figures. An axial surface is therefore one that faces in the axial direction or, in other words, an axial surface faces in a direction along the central axis. A radial surface therefore faces radially, generally toward or away from the central axis. It will be understood, however, that in actual implementation, the directional references used herein may not necessarily correspond with the installation and orientation of the corresponding component or device.

Figure 1:
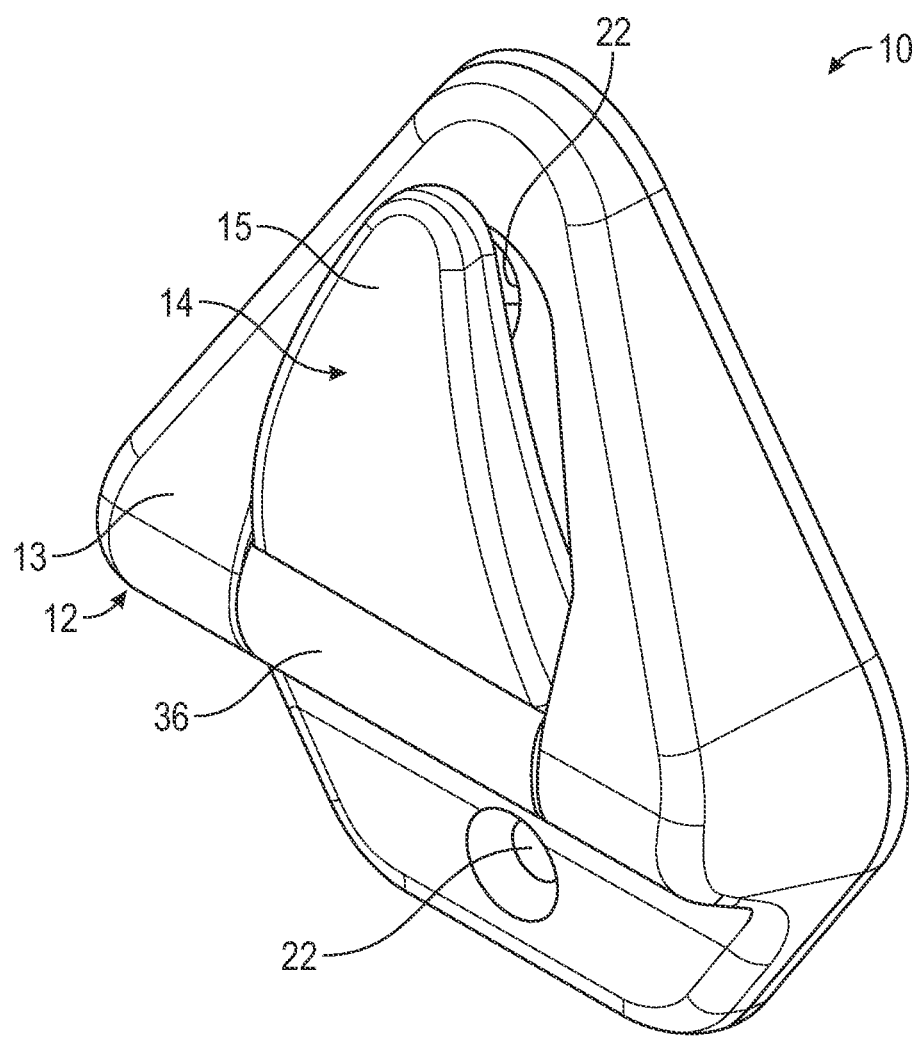
FIG. 1 is a perspective view of a hook embodying the principles of the present invention.

A ligature resistant, wall-mountable hook embodying the principles of the present invention is generally illustrated in FIG. 1 and designated at 10. As more fully seen in FIGS. 6 and 7, the hook 10 includes, as its principal components, a mounting assembly 12, which may include a wall plate 13 and a mounting base 16, a pivot arm 14 and a biasing assembly 18.

Figure 2:
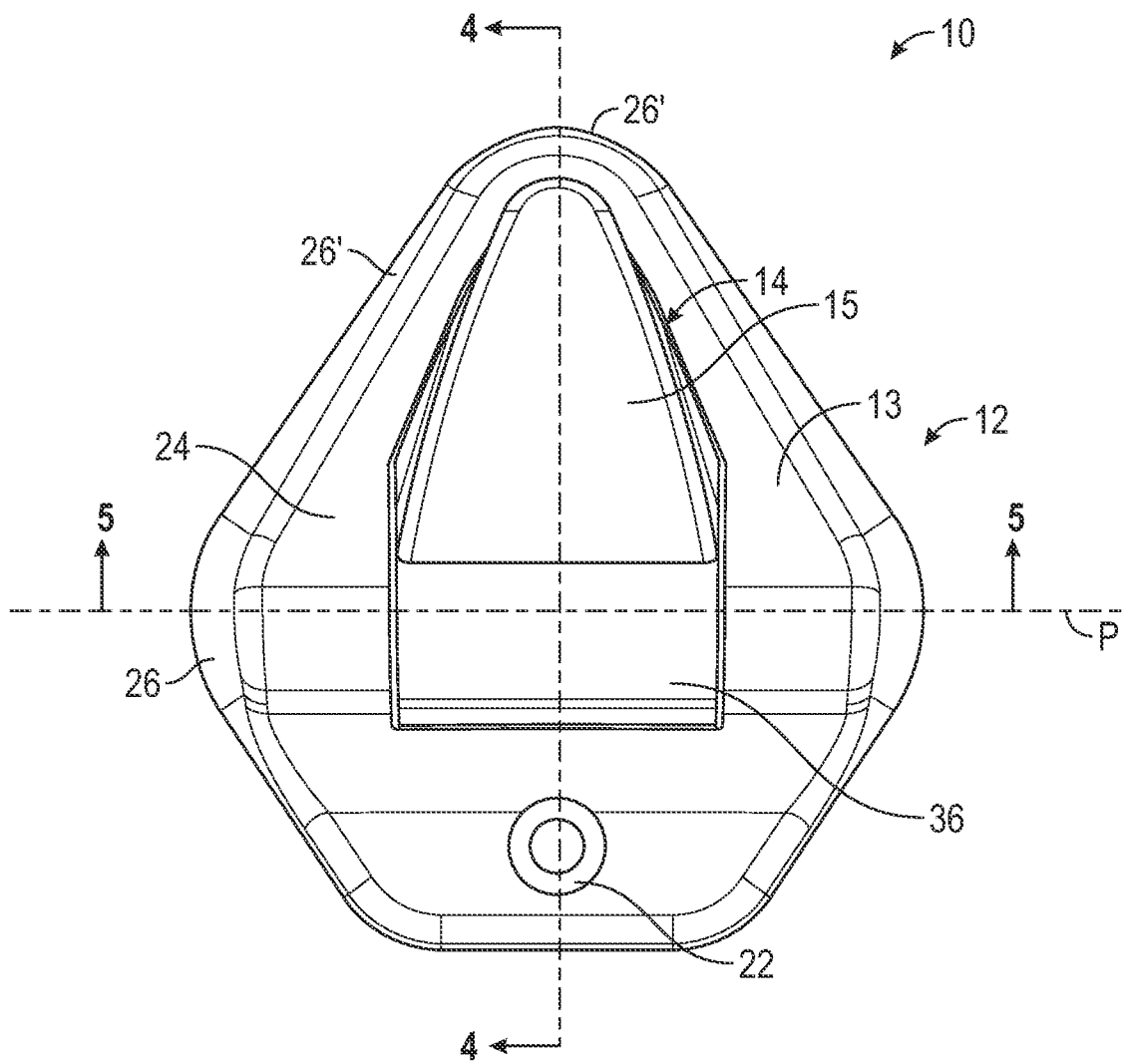
FIG. 2 is a front view of the hook seen in FIG. 1.
Figure 3:
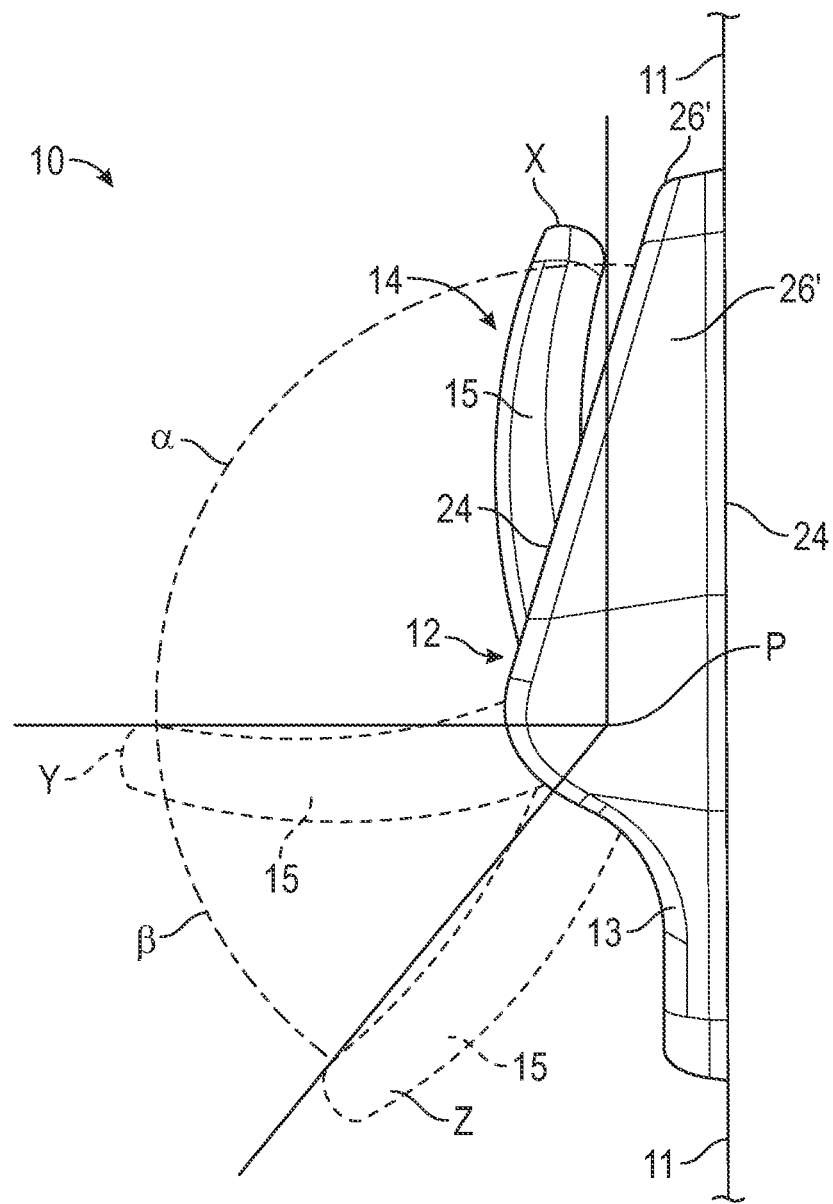
FIG. 3 is a side view of the hook, showing the pivot arm of the hook in various positions within its range of motion.
Figure 4:
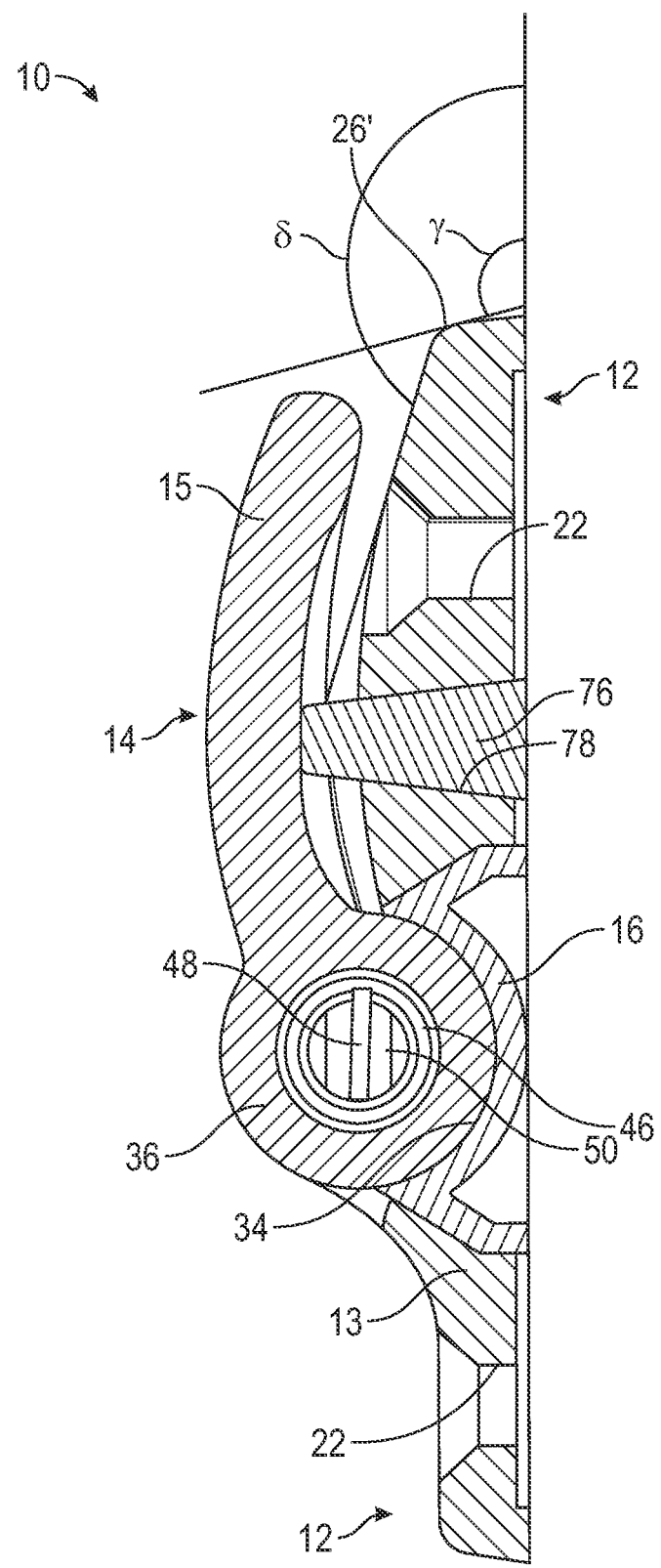
FIG. 4 is cross-sectional view of the hook, generally taken along line A-A in FIG. 2.
Figure 6:
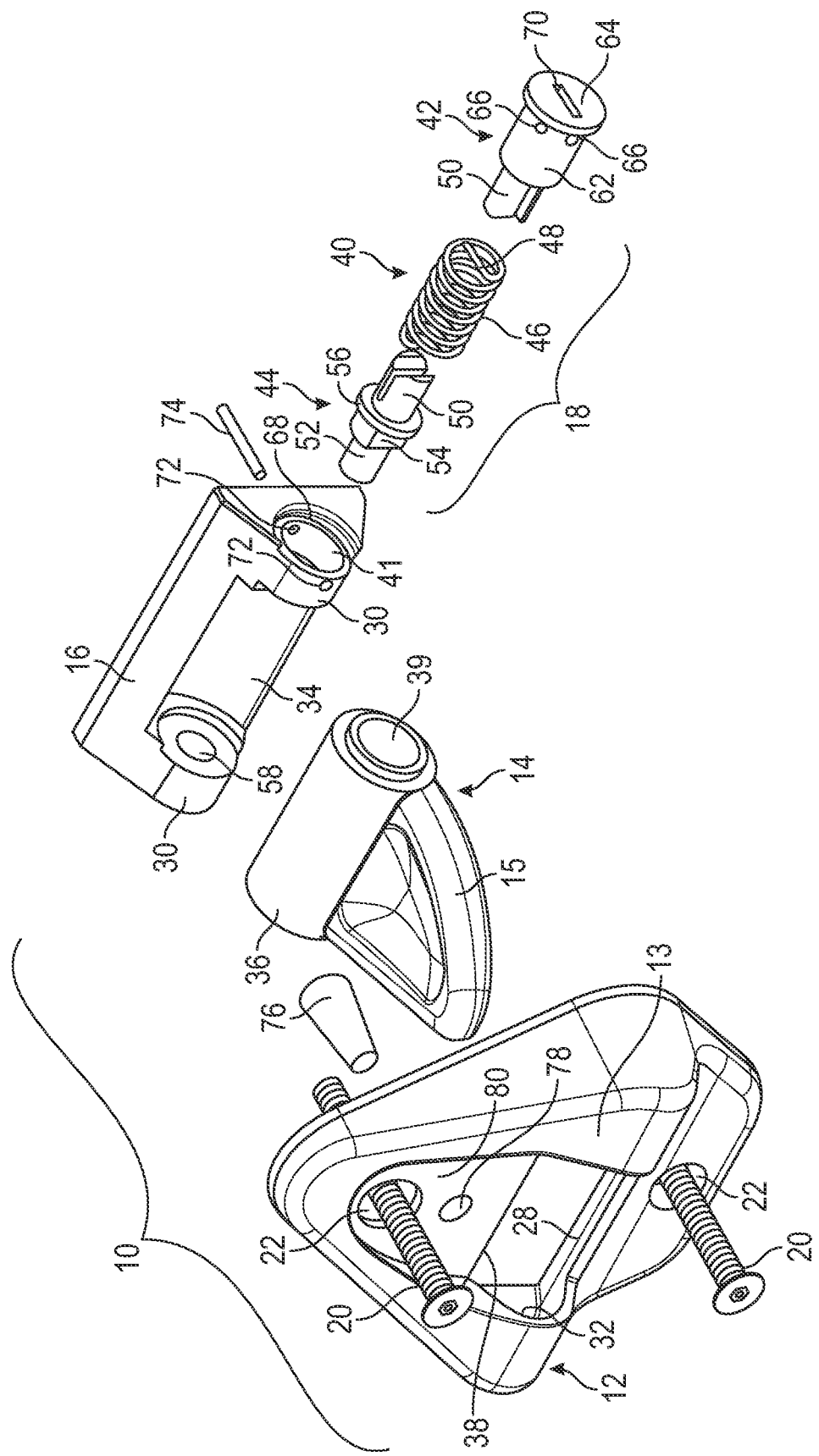
FIG. 6 is an exploded view of the hook.
Figure 7:
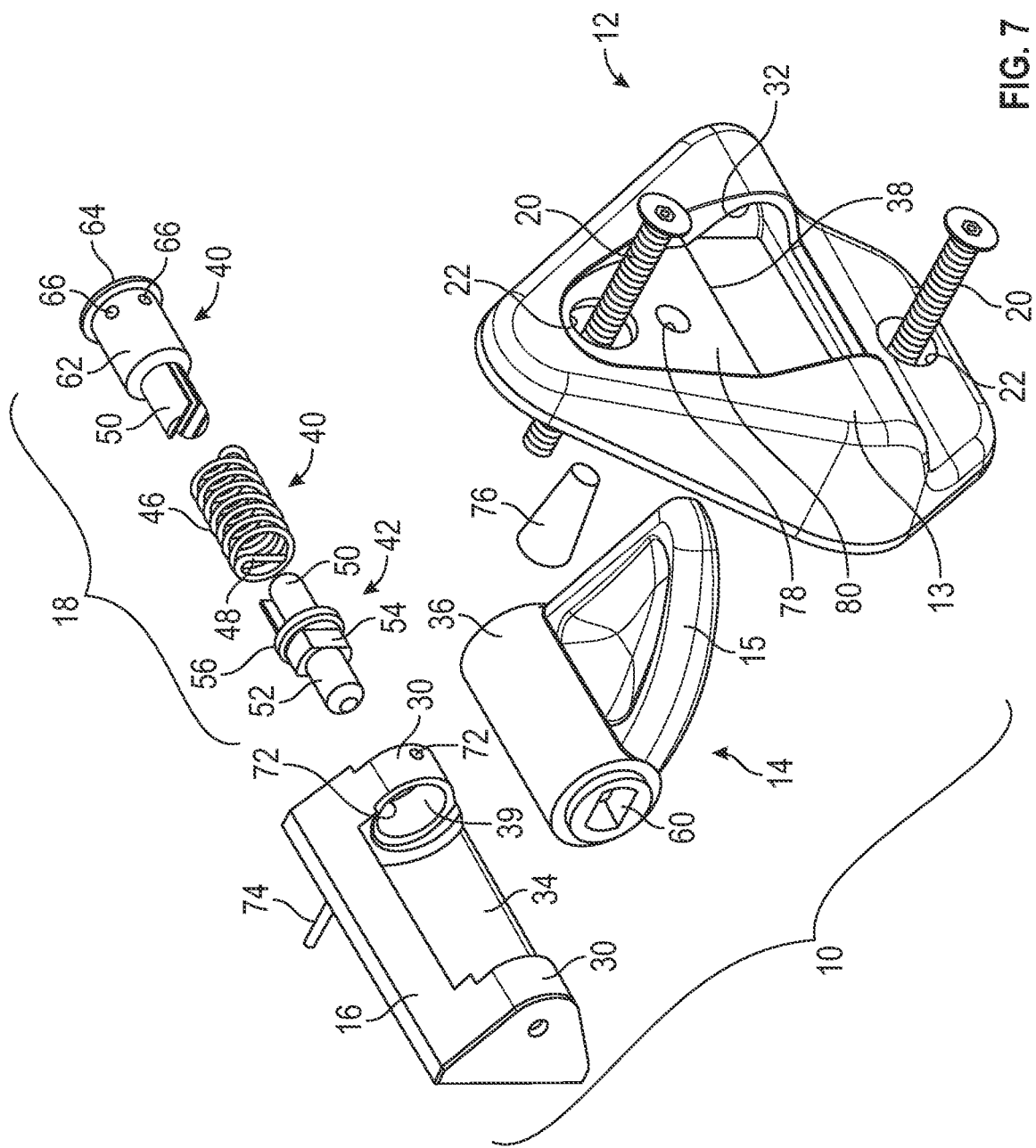
FIG. 7 is also an exploded view of the hook, but generally taken from the opposite side of view presented in FIG. 6.

Referring now to FIGS. 1-3, the hook 10 is configured for mounting to a vertically extending surface 11, such as the surface of a wall, door, column or other structure. Fasteners 20, such as wood screws, sheet metal screws or threaded bolts and as seen in FIGS. 6 and 7, extend through apertures 22 provided in the wall plate 13 to facilitate the mounting of the hook 10 to the structure.

The pivot arm 14 includes a catch 15 that extends from a pivot sleeve 36. In use, the catch 15 is provided for supporting a personal article, such as clothes, towels and other personal items, by positioning a portion of the personal article about the catch 15. When not in use, the catch 15 of the pivot arm 14 is kept in a retracted position, which is readily seen in FIGS. 1-4. In the retracted position, the catch 15 extends upward, generally adjacent to the wall plate 13 and generally aligned in a direction substantially parallel to a rear surface 24 of the mounting assembly 12 and the wall or support surface 11 to which the hook 10 is mounted. As such, the retracted position of the pivot arm 14 is preferably +/−10 degrees of vertical, when the hook is mounted to the wall or door 11. The retracted position is designated as X in the FIG. 2 and is achieved as a result of the biasing assembly 18.

When a personal article is placed on the catch 15, the weight of the article causes the pivot arm 14 rotate and move the catch 15 from the retracted position X to an in-use or extended position, which is representatively designated in FIG. 3 as Y, against a force applied by the biasing assembly 18. In the extended position Y, the catch 15 extends from wall plate 13 at an acute angle and up to perpendicular (90 degrees) to the surface of the wall 11 and/or the rear surface 24 of the wall plate 13, which, when installed, is to be positioned against the wall 11. Depending on the weight of the personal article placed on the catch 15, in the extended position the catch 15 may be at any angular orientation (α) between the retracted position or 0 degrees and not more than 90 degrees, measured downward from the retracted position X, the surface of the wall 11 or the rear planar surface 24 of the mounting plate 13, which may also be the rear surface of the wall plate 13.

Upon removal of the personal article, a force is no longer applied against the force exerted by the biasing assembly 18, resulting in the pivot arm 14 being rotated by the biasing assembly 18 moving the catch 15 back into the retracted position X.

The hook 10 is intended to support personal articles having a weight that is less or equal to a threshold weight. If an article having a weight greater than the threshold weight is placed on the catch 15 of the pivot arm 14, the pivot arm 14 will be caused to rotate to a position where the catch 15 is move beyond the extended position Y and into an over-extended or release positon, which representatively designated at Z in FIG. 2. In the release position Z, the catch 15 is at an angular orientation (β) of greater than 90 degrees, shown as being about 140 to 145 degrees, measured downward from the retracted position X or surface of the wall 11 or rear surface 24 of the wall plate 13. Beyond the extended position Y, the catch 15 of the pivot arm 14 is provided with a downward orientation and the article carried by the catch 15 will slide off of the end of the catch 15 and onto the floor of the facility where the hook 10 is installed. In this manner the hook 10 is designed such that the pivoting of its arm 14 renders the catch 15 as ligature resistant, meaning that any object, including a ligature, placed about the catch 15 and exerting a force on the catch 15 greater than the threshold weight, will cause the catch 15 to be moved beyond the extended position Y, toward the release position Z, and slide off of the end of the pivot arm 14.

Preferably, the threshold weight is in the range of 7 to 15 pounds, and more preferably about 11 pounds.

The wall plate 13 also exhibits characteristics rendering it as ligature resistant. These characteristics are perhaps best seen in FIGS. 1-3. Generally, all exposed surfaces of the wall plate 13 (namely those surfaces generally visible when the hook 10 is mounted to a support surface 11) are angularly oriented so that a downward force applied against any of the exposed surfaces would cause an item exerting the force to slide off of the wall plate 13. Thus, all upwardly facing, exposed surfaces of the mounting assembly 12 exhibit an angular orientation, measured from vertical, that is greater than 90 degrees.

As seen in FIGS. 2 and 3, the upwardly facing, exposed surfaces of the wall plate 13 include portions of a front surface 24, generally facing away from the wall 11, and portions of a perimeter surface 26, which extends from the outer edges of the front surface 24 back to the wall 11.

Figure 5:
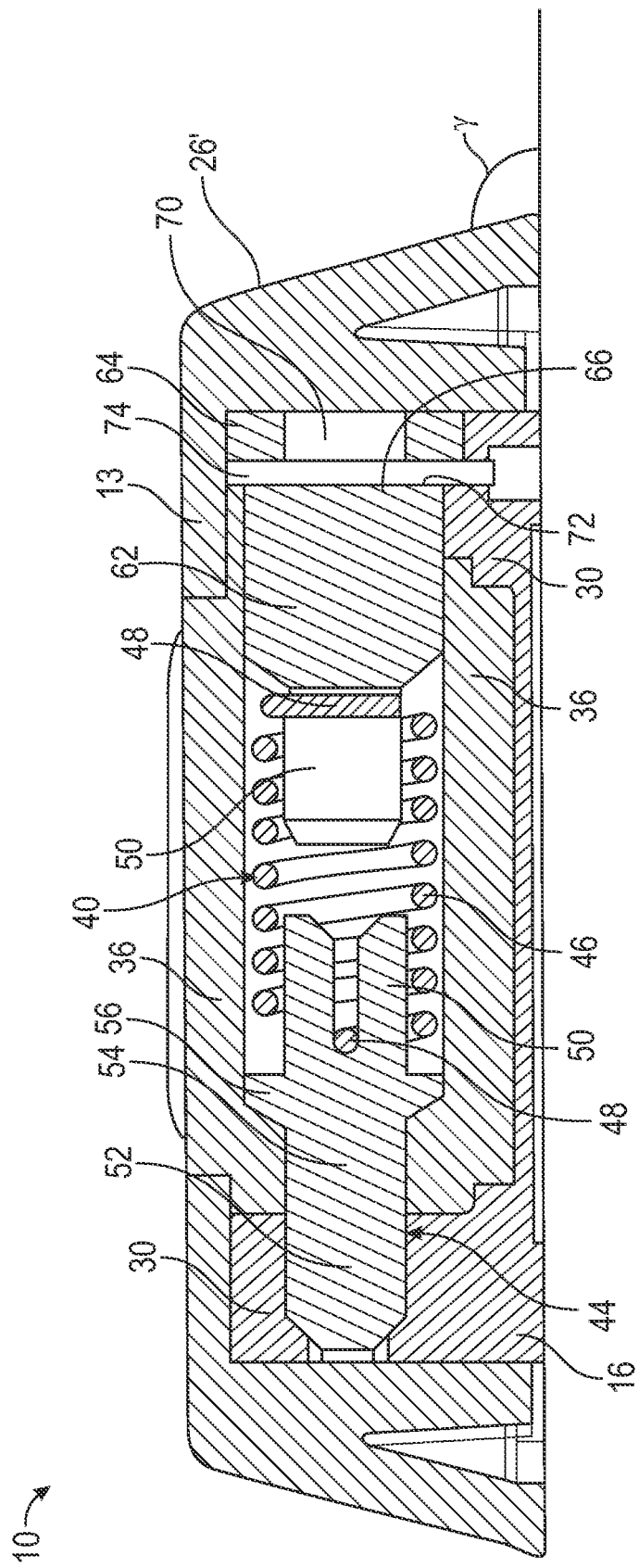
FIG. 5 is another cross-sectional view of the hook, generally taken along line B-B in FIG. 2.

To promote ligature resistance, the upper perimeter surfaces 26' of the wall plate 13, which as illustrated are the perimeter surfaces 26 located above the pivot axis (P) of the pivot arm 14 in the mounted position of the hook 10, all exhibit a taper toward the front surface 24. In other words, the upper perimeter surfaces 26' are formed at an exterior angular orientation γ (designated in FIGS. 4 and 5) relative to the wall 11, of greater than 90 degrees and about 104 degrees. Similarly, no portions of the front surface 24 are perpendicular to the wall 11. As seen in FIG. 3, the upper portion 24' of the front surface 24 is angled downward from the wall 11 at an angular orientation δ of greater than 90 degrees and about 163 degrees.

To achieve the above discussed movement of the pivot arm 14 and catch 15, the pivot arm 14 is supported relative to the wall plate 13 by the mounting base 16 and biased toward the retracted positon X by the biasing assembly 18.

The mounting base 16 is received within a recess 28 defined in the rear side of the wall plate 13 (the side of the wall plate 13 facing the wall 11) and is captively retained in the recess 28 when the hook 10 is mounted to the wall 11.

The recess 28 and mounting base 16 each include portions that are shaped to define a mated engagement between these components and prevent any substantial relative rotation or movement therebetween. As seen in FIGS. 6 and 7, the mounting base 16 includes wedge shaped bosses 30 that are received in corresponding wedge shaped cavities 32 of the recess 28.

Between the bosses 30, the mounting base 16 is provide with an open channel 34 and between the cavities 32 the wall plate 13 is provided with a window 38 defining an opening through the wall plate 13. The pivot sleeve 36 of the pivot arm 14 is received within the channel 34 such that, when the mounting base 16 is engaged with the wall plate 13, the catch 15 of the pivot arm 14 extends from the pivot sleeve 36 through the window 38.

The biasing assembly 18 of the pivot sleeve 36, serves at least two purposes. First, it is used to retain the pivot arm 14 in engagement with the mounting base 16. Second, it defines the threshold weight and provides the biasing force to the pivot arm 14 such that that catch 15 is returned and retained in the retracted positon X when not in use.

Referring to FIGS. 6 and 7, the biasing assembly 18 is received within a bore 39 defined through the pivot sleeve 36 by inserting the biasing assembly 18 through an opening 41 defined in one of the bosses 30 of the mounting base 16. The biasing assembly 18 includes a torsion spring 40, a fixed pin 42 and a moveable pin 44. The torsion spring 40 is preferably provided in the form of a helical spring body 46 having hinged/radial ends 48 at both ends of the body 46. On their inboard ends, the pins 42, 44 are the same and include slotted dowels 50 that extend into the body 46 and receive the radial ends 48 of the spring 40 within the slots of the dowels 50. On their outboard ends, the pins 42, 44 are constructed differently from each other.

Proceeding from its outboard end, the moveable pin 44 includes a pilot pin 52, a key 54 and stop flange 56.

When the biasing assembly 18 is fully inserted into and through the bore 39 of the pivot sleeve 36, the pilot pin 52 will protrude from the end of the pivot sleeve 36 and extend into a corresponding pilot bore 58 defined in the opposing boss 30 of the mounting base 16.

As illustrated, the key 54 is provided in the shape of a double truncated disk and matingly extends into a correspondingly shaped key opening 60 thereby fixing the moveable pin 44 relative to the pivot sleeve 36 for movement therewith. While the key 54 is illustrated as a double truncated disk and the key opening 60 a correspondingly shaped opening, the key 54 and key opening 60 may be of any corresponding shapes that operate to fix the moveable pin 44 relative to the pivot sleeve 36.

The stop flange 56 defines a diameter that is radially larger than the key opening 60 and, as such, limits the extent to which the moveable pin 44 can be extended into the key opening 60.

The fixed pin 42 includes a cylindrical shank 62 located between a stop flange 64 and the slotted dowel 50. The stop flange 64 has a diameter that is radially larger than opening 41 and is received into/onto a shoulder 68, located about the opening 41, and therefore limits insertion of the bias assembly 18 into the mounting base 16. As further discussed below, the outboard end of the fixed pin 42 is further provided with a slot 70 or other form of drive means allowing for the fixed pin 42 to be initially rotated relative to the mounting base 16.

Provided in the shank 62 are a series equidistantly spaced adjustment bores 66. The adjustment bores 66 extend through the center of the shank 62 and completely through the shank 62. Provided in the boss 30 of the mounting base 16 that receives the fixed pin 42, on opposed sides of the opening 41, are a pair of fixing bores 72. By rotating the fixed pin 42 via the slot 70 and a screwdriver or other driver, the adjustment bores 66 can be aligned with the fixing bores 72. Further, since the moveable pin 44 is fixed with respect to the pivot sleeve 36 of the pivot arm 14, by rotating the fixed pin 42 relative to the mounting base 16 and arm 14, the torsional force applied by spring 40 on the pivot arm 14 can be adjusted and preset to define the threshold weight. Once the rotated to the appropriate position, a set pin 74 is inserted through one of the fixing bores 72, the aligned adjustment bore 66 and the opposing fixing bore 72. With the set pin 74 positioned in the fixing bores and an adjustment bore 66, the fixed pin 42 is now fixed in position relative to the mounting base 16 and threshold weight has been established for the pivot arm 14.

With the pivot arm 14 secured to the mounting base 16, the pivot arm 14 is inserted through the window 38 of the wall plate 13 and the bosses 30 of the mounting base 16 received into the cavities 32 on the rear surface of the wall plate 13. The fasteners 20 may then be used to secure the hook 10 to a mounting surface or wall 11.

The hook 10 may additionally be provided with a bumper 76 to engage the catch 15 of the pivot arm 14 as the pivot arm 14 is biased into the retracted position. The bumper 76, which may be formed of rubber, extends through a bumper aperture 78 provided through the wall plate 13 in a location corresponding to a catch recess 80 defined in the front surface of the wall plate 13.

The above description is meant to be illustrative of at least one preferred implementation incorporating the principles of the invention. One skilled in the art will really appreciate that the invention is susceptible to modification, variation and change without departing from the true spirit and fair scope of the invention, as defined in the claims that follow. The terminology used herein is therefore intended to be understood in the nature of words of description and not words of limitation.

We claim:

1. A retractable and ligature resistant hook for supporting a personal article from a vertical support surface, the hook comprising:

a mounting plate, the mounting plate defining a rear planar surface for securement against the vertical support surface;

a pivot arm, the pivot arm being supported by the mounting plate and having a catch defining a terminal end of the pivot arm, the catch being moveable about a pivot axis between a retracted position, an extended position and an over-extended position, the extended position being located between the retracted and over-extended positions; and a biasing member coupled between the mounting plate and pivot arm and defining a threshold weight, the biasing member biasing the pivot arm into the retracted position, the pivot arm being moveable from the retracted position to the extended position upon application of a weight to the pivot arm up to the threshold weight, the pivot arm being moveable from the extended position to the over-extended position upon application of a weight to the pivot arm in an amount greater than the threshold weight, in the over-extended position the terminal end of the catch being configured to release a personal article supported by the catch.

2. The hook according to claim 1, wherein in the retracted position the pivot arm extends in a direction substantially parallel to a plane defined by the rear planar surface of the mounting plate.

3. The hook according to claim 1, wherein in the extended position the pivot arm extends in a direction oriented between substantially parallel to the rear planar surface of the mounting base and not greater than 90 degrees from a plane defined by the rear planar surface of the mounting plate.

4. The hook according to claim 1, wherein in the over-extended position the pivot arm extends in a direction oriented greater than 90 degrees from a plane defined by the rear planar surface of the vertical support surface.

5. The hook according to claim 1, wherein the mounting plate includes a wall plate and a mounting base.

6. The hook according to claim 5, wherein the pivot arm is rotationally mounted to the mounting base.

7. The hook according to claim 5, wherein the biasing member is coupled between the pivot arm and the mounting base.

8. The hook according to claim 7, wherein the biasing member is a torsion spring.

9. The hook according to claim 1, wherein the mounting plate further comprises ligature resistant features, the ligature resistant features including all exposed upwardly facing surfaces exhibiting an angular orientation of greater than 90 degrees measured from a plane define by the rear planar surface.

10. A retractable hook for supporting a personal article from a vertical support surface, the hook comprising:

a mounting plate, the mounting plate defining a rear planar surface for securement against the vertical support surface, the mounting plate including a wall plate and a mounting base, the mounting base being fixed relative to the wall plate;

a pivot arm, the pivot arm being supported by the mounting plate and having a catch defining a terminal end of the pivot arm, the catch being moveable about a pivot axis between a retracted position, an extended position and an over-extended position, the extended position being located between the retracted and over-extended positions; and a biasing member coupled between the mounting plate and pivot arm and defining a threshold weight, the biasing member biasing the pivot arm into the retracted position, the pivot arm being moveable from the retracted position to the extended position upon application of a weight to the pivot arm up to the threshold weight, the pivot arm being moveable from the extended position to the over-extended position upon application of a weight to the pivot arm in an amount greater than the threshold weight, the catch being configured to release the personal article in the over-extended position.

11. A ligature resistant, retractable hook for supporting a personal article, the hook being configured for surface-to-surface mounting to a vertical support surface, the hook comprising:

a mounting plate, the mounting plate being configured for surface-to-surface mounting and having a rear planar surface for securement against the vertical support surface, the mounting plate further including ligature resistant features comprising all upwardly facing exposed surfaces exhibiting an angular orientation of greater than 90 degrees measured from a plane defined by the rear planar surface; and a pivot arm, the pivot arm being moveably supported by the mounting plate and biased by a spring into a retracted position, the pivot arm being moveable between the retracted position, an over-extended position and an extended position located between the retracted position and the over-extended position, the over-extended position being a position located greater than 90 degrees from the retracted position, the pivot arm including a catch extending from a pivot sleeve, the pivot sleeve defining an axis of rotation for the pivot arm and for movement between the retracted, extended and over-extended positions, in the over-extended position the terminal end of the catch being configured to release a personal article supported by the catch.

12. The ligature resistant hook according to claim 11, wherein the spring is a torsion spring.

13. The ligature resistant hook according to claim 11, wherein the spring is located within the pivot sleeve.

14. The ligature resistant hook according to claim 11, wherein the pivot arm includes a bias against movement into the over-extended position up to a predetermined weight.

15. The ligature resistant hook according to claim 11, further comprising a biasing means for biasing the pivot arm into the retracted position.

16. The ligature resistant hook according to claim 15, wherein the biasing means defines a predetermined weight and biases the pivot arm against movement into the over-extended position at weights less than the predetermined weight.

17. The ligature resistant hook according to claim 16, wherein the predetermined weight is in the range of 7 to 15 pounds.

18. The ligature resistant hook according to claim 15, wherein the biasing means limits movement of the pivot arm from the retracted position to the extended position upon application of a weight to the pivot arm up to a threshold weight, and limits movement of the pivot arm into the over-extended position upon application of a weight to the pivot arm greater than the threshold weight.

* * * * *